United States Patent Office 2,850,391
Patented Sept. 2, 1958

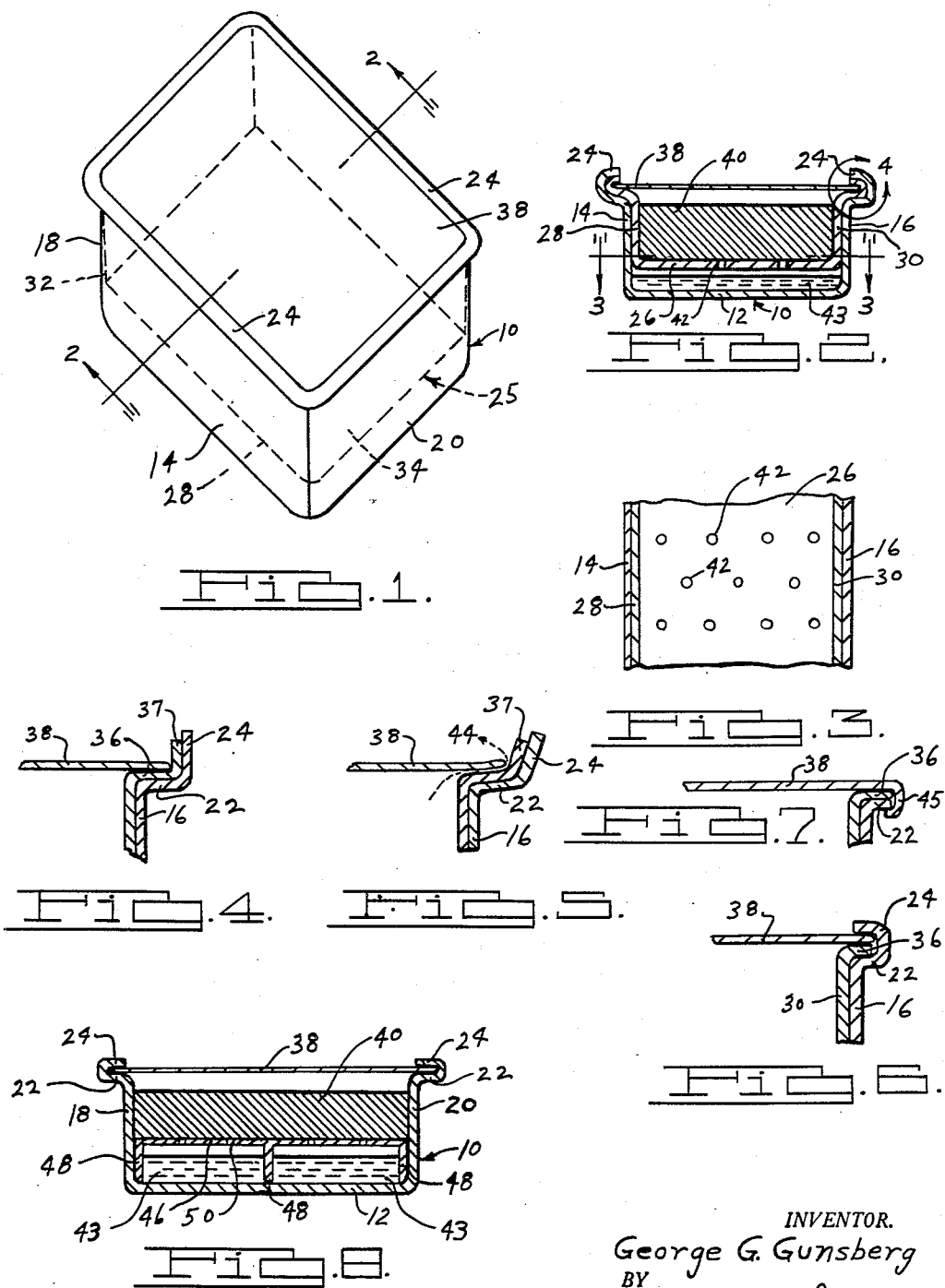

2,850,391

PACKAGED FROZEN FOOD ARTICLE

George G. Gunsberg, Huntington Woods, Mich.

Application June 27, 1955, Serial No. 518,075

4 Claims. (Cl. 99—171)

This invention relates to a packaged frozen food article, and to a container therefor, which container is adapted to function as both a sales container for the frozen food and as a cooking utensil for quick and easy cooking of the frozen food without removing it from the container.

It is an important object of this invention to provide a container for packaging frozen foods, such as corned beef and the like, which container may be used for cooking the food without removal therefrom, in a minimum of time and with a minimum of preparation beforehand.

It is another object of this invention to provide an article of packaged food, comprising: a frozen food, such as corned beef and the like, which is sliced and ready for eating except for being cooked; a novel container for the frozen sliced food which is made from a suiable heat resistant material, and which is capable of serving as a cooking utensil for the food; and, a predetermined quantity of ice in said container which is adapted to melt when the container is heated, so as to generate steam for cooking the food.

It is a further object of the invention to provide a container for frozen foods, as corned beef and the like, which is made from a suitable heat resistant material, such as a metal foil or the like, and which comprises a first part adapted to hold a pre-determined quantity of ice in the bottom thereof, and a second part adapted to nest in said first part and form a shelf which is perforated and adapted to support the frozen food thereon, and a cover enclosing said first and second parts.

It is still another object of this invention to provide an article of manufacture, comprising: a first outer box-like member made from a heat resistant material; a quantity of frozen food ready for cooking in said first member; the bottom wall of said first member being perforated; said first box-like member being nested in a second similar box-like member; the bottom walls of said members being spaced apart; a pre-determined quantity of ice in the space between said bottom walls; and, a cover for said box-like members.

It is a still further object of this invention to provide a container for frozen foods which is simple and rugged in construction, commercially practical and economical to manufacture, and, which is adapted to function as a cooking utensil for the frozen food.

Other objects, features and advantages of this invention will be apparent from the following detailed description and appended claims, reference being had to the accompanying drawing forming a part of the specification wherein like reference numerals designate corresponding parts of the several views.

In the drawings:

Fig. 1 is a perspective view of an illustrative embodiment of the invention;

Fig. 2 is an elevational transverse sectional view of the structure illustrated in Fig. 1, taken along the line 2—2 thereof;

Fig. 3 is a fragmentary plan view of the bottom of the container inner member, taken along the line 3—3 of Fig. 2;

Fig. 4 is an enlarged fragmentary elevational sectional view of the structure illustrated in Fig. 2, taken within the circle marked 4;

Fig. 5 is an enlarged fragmentary elevational sectional view of the structure illustrated in Fig. 4, but showing the flanges bent back for venting purposes during the cooking operation;

Fig. 6 is an enlarged fragmentary elevational sectional view, similar to Fig. 4, but showing another embodiment of the invention;

Fig. 7 is an enlarged fragmentary elevational sectional view, similar to Fig. 6, but showing a further modification; and, Fig. 8 is a longitudinal elevational sectional view of another embodiment of the invention.

Before explaining in detail the present invention, it is to be understood, that the invention is not limited in its application to the details of construction and arrangement of parts illustrated in the accompanying drawing, since the invention is capable of other embodiments and of being practiced or carried out in various ways. Also, it is to be understood, that the phraseology and terminology employed herein is for the purpose of description and not limitation.

Referring now to the drawings, and in particular to Figs. 1 through 5, a preferred embodiment of the invention is shown which comprises a substantially rectangular container outer member 10 which includes a bottom wall 12, integral side walls 14 and 16, and integral end walls 18 and 20. The container outer part 10 is provided along the upper ends of the side and end walls with an integral, outwardly extending horizontal flange 22, which is provided with an extension 24 along the outer edge thereof, the function of which will be more fully explained hereinafter. The container outer part 10 is open on the upper side thereof.

Slideably nested inside the container outer part 10 is a container inner part 25, which is also substantially rectangular in shape, and, which is provided with a bottom wall 26, integral side walls 28 and 30, and integral end walls 32 and 34. The container inner part 25 is open on the upper side thereof, and is provided with an integral, outwardly extending horizontal flange 36 around the upper edge of the side and end walls, which flange 36 is adapted to seat on the flange 22 of the container outer part 10. The flange 36 is provided with an integral extension 37. A cover 38, which is shaped in accordance with the shape of the container parts 10 and 25, is adapted to enclose said container parts and to have the outer cover edges seated on the upper side of the inner part flange 36. The upwardly extending flange parts 24 and 37 are adapted to be folded inwardly over the outer edges of the cover 38 to provide a suitable seal therebetween. The cover 38 may be made from any suitable light-weight cardboard, metal foil or the like.

As shown in Figs. 2 and 3, a frozen food 40, such as corned beef or the like, is adapted to be stored in the inner container part 25. The bottom wall 26 of the container inner part is provided with a plurality of apertures 42. As shown in Fig. 2, the bottom wall 26 of the container inner part is adapted to be spaced upwardly from the bottom wall 12 of the container outer part 10, so as to provide a space for a pre-determined quantity of ice 43, which is adapted to be used to generate steam, to cook the frozen food 40 when the container outer part 10 is heated.

In the practice of the invention, a pre-determined amount of water is first inserted into the bottom of the container outer part 10, and then the container inner part 25 is nested inside the outer part 10. The sliced corned beef 40, or other food, is then placed inside the inner part 25, and the cover 38 is put in place on top of the flange 36, and this is shown in Fig. 4. The flange extensions 37 and 24 are then folded inwardly and crimped in place over the outer edges of the cover 38. The packaged food article is then subjected to a freezing temperature, by any suitable freezing equipment, whereby the food 40 will be frozen, and, the water added to the outer container will be frozen to form the ice 43. The packaged food article is then ready for marketing.

The purchaser of the frozen packaged food article of the invention may keep the article in his home freezer for ready use, as desired. When the purchaser wishes to use the frozen food, it is merely necessary to take the container out of the freezer, uncrimp the flange extensions 37 and 24, at a few spots, as shown in Fig. 5, and place the container on a suitable heating unit. It will be obvious, that the ice 43 will melt to water, and the water changed to steam as the heating progresses. The steam so formed will rise, pass through the perforations 42 in the inner part bottom wall 26, and permeate the food 40 and cook the food quickly and with no fussing with any other cooking utensil. The excessive steam is permitted to pass along the path 44 and out to the atmosphere, as shown in Fig. 5. After the required cooking time has elapsed, depending upon the amount of food 40, the cover 38 may be removed by first uncrimping the entire length of flange extensions 37 and 24 and then lifting the cover off the container. The food 40 is then ready for instant use as desired.

Although the container of the invention is illustrated as being rectangular in shape, it will be understood, that said container may be shaped as desired, as, for example, it may be cylindrically or squarely shaped. The container parts 10 and 25 are preferably made from a suitable metal foil, and, the cover 38 may be made from the same material, or from any other suitable material.

A desirable overall size for a container adapted to hold enough corned beef to serve about four people would be a container having an overall length of eight and one-quarter inches, a width of four and one-half inches and a height of three-quarters of an inch. It has been found, that the space for the ice or water between the inner part bottom wall 26 and the outer part bottom wall 12, in the above described size container should be approximately one-quarter of an inch.

It will be obvious, that the packaged food article of the invention could be marketed without the ice 43, leaving the purchaser to add the water for the steaming or cooking of the frozen food. It is preferable, however, to market the instant packaged food article with the ice 43.

In Fig. 6, there is shown a modification of the invention wherein the container inner part flange 36 is not provided with the flange extension 37. This modification makes it easier to crimp and uncrimp the flange extension 24 over the edges of the cover 38.

Fig. 7 discloses a further modification of the invention, wherein, the flanges extensions 24 and 37 are eliminated, and, the cover 38 is provided with a flange 45 which is adapted to be crimped down and around the flanges 22 and 36 on the container outer and inner parts, respectively.

Fig. 8 is a longitudinal sectional view of a modification of the invention, wherein, the container inner part 25 is eliminated, and replaced by a shelf 46 which is provided with a plurality of transverse legs, as 48. The shelf 46 is provided with a plurality of perforations 50, which are similar to the perforations 42. The cover 38 is adapted to seat directly on the flange 22 of the container outer part 10 and be held in place by having the flange extension 24 crimped on top of the edges of the cover. For venting purposes, the flange extension 24 may be uncrimped at a few spots, as needed. In use, the embodiment of Fig. 8 would be used in the same manner as the embodiment of Fig. 2.

It is to be understood, that the present invention also includes the novel method disclosed herein, for making a packaged frozen food article. It will be obvious, that the instant container may be made to any desired size.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A packaged frozen food article comprising: a first box-like member made from a metal foil; a quantity of frozen food ready for cooking in said first member; the bottom wall of said first member being perforated; a second box-like member made from a metal foil; a quantity of ice in the bottom of said second member; said first box-like member being nested inside said second box-like member, over said ice; and, a cover enclosing said members.

2. A packaged frozen food article comprising: a box-like member made from a metal foil; a quantity of ice disposed in the bottom of said member; means in said box-like member adapted to form a support above said ice; said means being perforated; a quantity of frozen food ready for cooking carried by said means; and a cover enclosing said box-like member.

3. The invention as set forth in claim 2, wherein: said means comprises a second box-like member made from a metal foil nested inside the first named box-like member and being provided with a perforated bottom wall.

4. The invention as set forth in claim 2, wherein: said means comprises a shelf made from a metal foil having perforations therethrough and which is provided with a plurality of legs adapted to rest on the bottom wall of the box-like member and support the shelf above the ice.

References Cited in the file of this patent

UNITED STATES PATENTS

| | | |
|---|---|---|
| 93,864 | Doepken | Aug. 17, 1869 |
| 1,003,112 | Johnson | Sept. 12, 1911 |
| 1,290,378 | Sibley | Jan. 7, 1919 |
| 1,334,930 | Chadwick | Mar. 23, 1920 |
| 1,648,725 | Endicott | Nov. 8, 1927 |
| 1,881,873 | Newcomb | Oct. 11, 1932 |
| 2,318,842 | Eaton | May 11, 1943 |
| 2,673,806 | Colman | Mar. 30, 1954 |
| 2,674,536 | Fisher | Apr. 6, 1954 |